(12) United States Patent
Chen et al.

(10) Patent No.: US 9,758,639 B2
(45) Date of Patent: Sep. 12, 2017

(54) RUBBER COMPOSITION WITH IMIDAZOLE-BASED SILICA SHIELDING AGENT

(71) Applicant: Bridgestone Corporation, Tokyo (JP)

(72) Inventors: Yaohong Chen, Akron, OH (US); Arif Omer Gozen, Akron, OH (US); Toshihiro Uchiyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 48 days.

(21) Appl. No.: 14/700,328

(22) Filed: Apr. 30, 2015

(65) Prior Publication Data

US 2015/0315362 A1 Nov. 5, 2015

Related U.S. Application Data

(60) Provisional application No. 61/986,417, filed on Apr. 30, 2014.

(51) Int. Cl.
| | | |
|---|---|---|
| *C08K 5/34* | (2006.01) |
| *C08C 19/25* | (2006.01) |
| *C08K 3/04* | (2006.01) |
| *C08K 3/36* | (2006.01) |
| *C08K 5/3445* | (2006.01) |

(52) U.S. Cl.
CPC ............ *C08K 5/3445* (2013.01); *C08C 19/25* (2013.01); *C08K 3/04* (2013.01); *C08K 3/36* (2013.01); *C08K 2003/045* (2013.01)

(58) Field of Classification Search
CPC .......... C08K 5/3445; C08K 3/04; C08K 3/36; C08K 2003/045; C08C 19/25
USPC ....................................................... 524/106
See application file for complete search history.

(56) References Cited

U.S. PATENT DOCUMENTS

| | | |
|---|---|---|
| 5,140,055 A | 8/1992 | Hirata et al. |
| 5,290,901 A | 3/1994 | Burns et al. |
| 5,508,333 A | 4/1996 | Shimizu |
| 5,580,919 A | 12/1996 | Agostini et al. |
| 5,674,932 A | 10/1997 | Agostini et al. |
| 5,811,479 A | 9/1998 | Labauze |
| 6,013,718 A | 1/2000 | Cabioch et al. |
| 6,140,393 A | 10/2000 | Bomal et al. |
| 6,211,278 B1 | 4/2001 | Vanel |
| 6,245,834 B1 | 6/2001 | Bomal et al. |
| 6,353,045 B1 | 3/2002 | Kayser et al. |
| 6,362,253 B1 | 3/2002 | Durel |
| 6,465,544 B1 | 10/2002 | Bomal et al. |
| 6,608,145 B1 | 8/2003 | Lin et al. |
| 6,900,263 B2 | 5/2005 | Hodge |
| 7,799,870 B2 | 9/2010 | Hergenrother et al. |
| 7,836,928 B2 | 11/2010 | Hogan et al. |
| 2003/0199626 A1 | 10/2003 | Lin et al. |
| 2005/0222446 A1 | 10/2005 | Plehlers |
| 2006/0086450 A1* | 4/2006 | E. Hogan .................. B60C 1/00 156/110.1 |
| 2008/0299046 A1 | 12/2008 | White et al. |
| 2010/0178266 A1 | 7/2010 | Huggins et al. |

FOREIGN PATENT DOCUMENTS

| | | |
|---|---|---|
| EP | 0761748 B1 | 5/2004 |
| EP | 1484359 A1 | 12/2004 |
| EP | 2128186 A1 | 12/2009 |
| EP | 1924608 B1 | 1/2010 |
| JP | 3915334 B1 | 8/1964 |
| JP | 2001192506 A | 7/2001 |
| JP | 4473429 B2 | 5/2010 |
| JP | 4482210 B2 | 6/2010 |
| WO | 2009062733 A1 | 5/2009 |
| WO | 2011075121 A1 | 6/2011 |
| WO | 2012031005 A2 | 3/2012 |

OTHER PUBLICATIONS

Brinke, J.W. Ten, et al., "The Influence of Silane Sulfur and Carbon Rank on Processing of a Silica Reinforced Tire Tread Compound," Rubber Chemistry and Technology, vol. 76, p. 12+, 2003.

Ladouce-Stelandre, L., et al., "Dynamic Mechanical Properties of Precipitated Silica Filled Rubber: Influence of Morphology and Coupling Agent," Rubber Chemistry and Technology, vol. 76, p. 145+, 2003.

Suzuki, Toshio, "Preparation of Poly(dimethylsiloxane) Macromonomers by the Initiator Method," Polymer, vol. 30, p. 333-37, 1989.

* cited by examiner

*Primary Examiner* — Ling Choi
*Assistant Examiner* — Ronald Grinsted
(74) *Attorney, Agent, or Firm* — Meredith E. Hooker; Jenny L. Sheaffer

(57) ABSTRACT

Disclosed herein are vulcanizable and vulcanized rubber compositions comprising a conjugated diene polymer or copolymer, silica, and a substituted imidazole-based silica shielding agent of Formula (I), and methods for preparing such rubber compositions. Also disclosed herein are tire components, such as tire treads, containing the rubber compositions disclosed herein.

20 Claims, No Drawings

RUBBER COMPOSITION WITH IMIDAZOLE-BASED SILICA SHIELDING AGENT

CROSS-REFERENCE TO RELATED APPLICATIONS

This application claims priority to and all benefit from U.S. Provisional Application Ser. No. 61/986,417 filed Apr. 30, 2014, the disclosure of which is herein incorporated by reference in its entirety.

FIELD OF THE DISCLOSURE

The present disclosure relates to vulcanizable and vulcanized rubber compositions comprising a conjugated diene polymer or copolymer, silica, and a specific substituted imidazole-based silica shielding agent, and to methods for preparing such rubber compositions. The rubber compositions are useful in producing tire components such as tire treads. The present disclosure also relates to tire components containing the rubber compositions disclosed herein.

BACKGROUND

Silica is frequently used as a filler in rubber compositions that are intended for or are utilized in tire components, primarily tire treads. While silica can impart certain desirable properties (e.g., decreased rolling resistance, improved abrasion resistance) to the rubber compositions into which it is incorporated, successful incorporation and mixing of the silica can be difficult for various reasons including the tendency of the silica to agglomerate together which can lead to uneven and inconsistent dispersion throughout the rubber composition. The limited compatibility of silica (as compared to other fillers such as carbon black) with the conjugated diene (co)polymer(s) used in these rubber compositions has led to the use of relatively expensive functionalized (co)polymer(s), as well as processing and dispersing aids and coupling agents. Along with the additional expense involved with adding coupling agents, their use can have other disadvantages. For example, unreacted silica coupling agent that remains in a rubber composition can lead to an undesirable decrease in abrasion resistance. Increased mixing of the rubber composition (allowing for more complete reaction of the silica and the coupling agent) can decrease this undesirable result; however, longer mixing times can themselves lead to higher costs and other disadvantages.

SUMMARY

Disclosed herein are vulcanizable and vulcanized rubber compositions comprising a conjugated diene polymer or copolymer, silica, and a specific substituted imidazole-based silica shielding agent, and methods for preparing such rubber compositions. Also disclosed herein are tire components, such as tire treads, containing the rubber compositions disclosed herein.

In a first embodiment, a vulcanizable rubber composition comprising a conjugated diene polymer or copolymer, silica, and from 0.5 to 20 phr of an imidazole of Formula (I) is disclosed. Formula (I) is represented by the following structure.

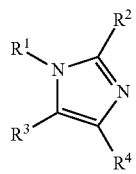

According to Formula (I): $R^1$ is a hydrocarbyl group having from 2 to 20 carbon atoms, $R^2$ is selected from the group consisting of a hydrocarbyl group having from 1 to 4 carbon atoms and a phenyl group, $R^3$ is selected from the group consisting of hydrogen and a hydrocarbyl group having from 1 to 20 carbon atoms, and $R^4$ is selected from the group consisting of hydrogen and a hydrocarbyl group having from 1 to 20 carbon atoms.

In a second embodiment, a vulcanized rubber composition comprising a conjugated diene polymer or copolymer, silica, a curative, and from 0.5 to 20 phr of an imidazole of Formula (I) is disclosed. Formula (I) is represented by the following structure.

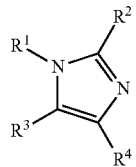

According to Formula (I): $R^1$ is a hydrocarbyl group having from 2 to 20 carbon atoms, $R^2$ is selected from the group consisting of a hydrocarbyl group having from 1 to 4 carbon atoms and a phenyl group, $R^3$ is selected from the group consisting of hydrogen and a hydrocarbyl group having from 1 to 20 carbon atoms, and $R^4$ is selected from the group consisting of hydrogen and a hydrocarbyl group having from 1 to 20 carbon atoms.

In a third embodiment, a process for producing a vulcanized rubber composition is disclosed. This process comprises: (a) mixing a master-batch comprising (i) a conjugated diene polymer or copolymer, (ii) silica, and (iii) from 0.5 to 20 phr of an imidazole, wherein the imidazole is represented by Formula (I); (b) mixing a final batch comprising (i) the master-batch, and (ii) a curative; and (c) vulcanizing the final batch, thereby producing a vulcanized rubber composition.

DETAILED DESCRIPTION

Disclosed herein are vulcanizable and vulcanized rubber compositions comprising a conjugated diene polymer or copolymer, silica and a specific substituted imidazole-based silica shielding agent, and methods for preparing such rubber compositions. Also disclosed herein are tire components, such as tire treads, containing the rubber compositions disclosed herein. In a first embodiment, a vulcanizable rubber composition comprising a conjugated diene polymer or copolymer, silica, and from 0.5 to 20 phr of an imidazole of Formula (I) is disclosed. Formula (I) is represented by the following structure.

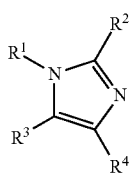

According to Formula (I): $R^1$ is a hydrocarbyl group having from 2 to 20 carbon atoms, $R^2$ is selected from the group consisting of a hydrocarbyl group having from 1 to 4 carbon atoms and a phenyl group, $R^3$ is selected from the group consisting of hydrogen and a hydrocarbyl group having from 1 to 20 carbon atoms, and $R^4$ is selected from the group consisting of hydrogen and a hydrocarbyl group having from 1 to 20 carbon atoms. In a second embodiment, a vulcanized rubber composition comprising a conjugated diene polymer or copolymer, silica, a curative, and from 0.5 to 20 phr of an imidazole of Formula (I) is disclosed. Formula (I) is represented by the following structure.

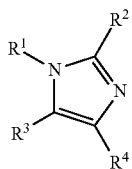

According to Formula (I): $R^1$ is a hydrocarbyl group having from 2 to 20 carbon atoms, $R^2$ is selected from the group consisting of a hydrocarbyl group having from 1 to 4 carbon atoms and a phenyl group, $R^3$ is selected from the group consisting of hydrogen and a hydrocarbyl group having from 1 to 20 carbon atoms, and $R^4$ is selected from the group consisting of hydrogen and a hydrocarbyl group having from 1 to 20 carbon atoms. In a third embodiment, a process for producing a vulcanized rubber composition is disclosed. This process comprises: (a) mixing a master-batch comprising (i) a conjugated diene polymer or copolymer, (ii) silica, and (iii) from 0.5 to 20 phr of an imidazole, wherein the imidazole is represented by Formula (I); (b) mixing a final batch comprising (i) the master-batch, and (ii) a curative; and (c) vulcanizing the final batch, thereby producing a vulcanized rubber composition.

Unless otherwise indicated herein, the term "Mooney viscosity" refers to the compound Mooney viscosity, $M_{1+4}$.

Unless otherwise indicated, the terms "G'," "elastic modulus," and "elastic modulus G'" are used interchangeably herein.

Unless otherwise indicated, the terms "alkyl" and "alkyl group" are used interchangeably herein to refer to a univalent group derived from an alkane by removal of a hydrogen atom from any carbon atom. Generally, the terms should be understood to include both branched and linear/unbranched structures.

Unless otherwise indicated, the terms "cycloalkyl" and "cycloalkyl group" are used interchangeably herein to refer to a univalent group derived from a cycloalkane by removal of a hydrogen atom from a ring carbon atom.

Unless otherwise indicated, the terms "alkenyl" and "alkenyl group" are used interchangeably herein to refer to a univalent group derived from an alkene by removal of a hydrogen atom from any carbon atom. Generally, the terms should be understood to include both branched and linear/unbranched structures.

Unless otherwise indicated, the terms "alkynyl" and "alkynyl group" are used interchangeably herein to refer to a univalent group derived from an alkyne by removal of a hydrogen atom from any carbon atom. Generally, the terms should be understood to include both branched and linear/unbranched structures.

Unless otherwise indicated, the term "hydrocarbyl group" is used herein to refer to a univalent group formed by removing a hydrogen atom from a hydrocarbon. The term "hydrocarbon" is used herein to refer to a compound formed from hydrogen and carbon and containing a carbon backbone.

As used herein, the terms silica shielding agent and SSA are used interchangeably.

As discussed above, according to the first, second, and third embodiments disclosed herein, the imidazole of Formula (I) is utilized in an amount of 0.5 to 20 phr in the rubber composition (i.e., the vulcanizable rubber composition or the vulcanized rubber composition). In certain exemplary embodiments, the imidazole is utilized in an amount of 0.5 to 10 phr, including 1 to 5 phr. It should be understood that the foregoing amounts and ranges apply to all variations of Formula (I), as discussed in more detail in the following paragraphs.

As discussed above, within Formula (I), $R^1$ is a hydrocarbyl group having from 2 to 20 carbon atoms. In certain exemplary embodiments according to the first, second, and third embodiments disclosed herein, $R^1$ is a hydrocarbyl group having from 4 to 16 carbon atoms, including in certain embodiments from 8 to 12 carbon atoms. In certain exemplary embodiments according to the first, second, and third embodiments disclosed herein, $R^1$ is an alkyl group having from 2 to 20 carbon atoms, including in certain embodiments alkyl having from 4 to 16 carbon atoms, and including in certain embodiments alkyl having from 8 to 12 carbon atoms. In certain exemplary embodiments according to the first, second, and third embodiments disclosed herein, $R^1$ is selected from the group consisting of an alkyl group, a cycloalkyl group, an alkenyl group, and an alkynyl group, with the foregoing range for carbon numbers applying.

As discussed above, within Formula (I), $R^2$ is selected from the group consisting of a hydrocarbyl group having from 1 to 4 carbon atoms and a phenyl group. In certain exemplary embodiments according to the first, second, and third embodiments disclosed herein, $R^2$ is selected from the group consisting of an alkyl group, a cycloalkyl group, an alkenyl group, an alkynyl group, and a phenyl group, with the foregoing range for carbon numbers applying. In certain exemplary embodiments according to the first, second, and third embodiments disclosed herein, $R^2$ is selected from alkyl groups having 1 to 4 carbon atoms. In certain exemplary embodiments according to the first, second, and third embodiments disclosed herein, $R^2$ is methyl or ethyl.

As discussed above, within Formula (I), $R^3$ is selected from the group consisting of hydrogen and a hydrocarbyl group having from 1 to 20 carbon atoms. In certain exemplary embodiments according to the first, second, and third embodiments disclosed herein, $R^3$ is selected from the group consisting of hydrogen, an alkyl group, an alkenyl group, and an alkynyl group, with the foregoing range for carbon numbers applying. In certain exemplary embodiments according to the first, second, and third embodiments disclosed herein, $R^3$ is hydrogen. In other exemplary embodiments according to the first, second, and third embodiments disclosed herein, $R^3$ is an alkyl group having from 1 to 4 carbon atoms. In certain exemplary embodiments according to the first, second, and third embodiments disclosed herein, $R^3$ is selected from hydrogen and an alkyl group having from 1 to 4 carbon atoms.

As discussed above, within Formula (I), $R^4$ is selected from the group consisting of hydrogen and a hydrocarbyl group having from 1 to 20 carbon atoms. In certain exemplary embodiments according to the first, second, and third embodiments disclosed herein, $R^4$ is selected from the group consisting of hydrogen, an alkyl group, an alkenyl group, and an alkynyl group, with the foregoing range for carbon numbers applying. In certain exemplary embodiments according to the first, second, and third embodiments disclosed herein, $R^4$ is hydrogen. In other exemplary embodiments according to the first, second, and third embodiments disclosed herein, $R^3$ is an alkyl group having from 1 to 4 carbon atoms. In certain exemplary embodiments according to the first, second, and third embodiments disclosed herein, $R^3$ is selected from hydrogen and an alkyl group having from 1 to 4 carbon atoms.

In certain exemplary embodiments according to the first, second and third embodiments disclosed herein, Formula (I) is as follows: $R^1$ is selected from the group consisting of an alkyl group, a cycloalkyl group, an alkenyl group, and an alkynyl group; $R^2$ is selected from the group consisting of an alkyl group, a cycloalkyl group, an alkenyl group, an alkynyl group, and a phenyl group; $R^3$ is selected from the group consisting of hydrogen, an alkyl group, an alkenyl group, and an alkynyl group; and $R^4$ is selected from the group consisting of hydrogen, an alkyl group, an alkenyl group, and an alkynyl group. In other exemplary embodiments according to the first, second, and third embodiments disclosed herein, Formula (I) is such that at least one of the following is met: (1) $R^1$ is selected from the group consisting of an alkyl group, a cycloalkyl group, an alkenyl group, and an alkynyl group; (2) $R^2$ is selected from the group consisting of an alkyl group, a cycloalkyl group, an alkenyl group, an alkynyl group, and a phenyl group; (3) $R^3$ is selected from the group consisting of hydrogen, an alkyl group, an alkenyl group, and an alkynyl group; and (4) $R^4$ is selected from the group consisting of hydrogen, an alkyl group, an alkenyl group, and an alkynyl group.

Moreover, it should be understood that $R^1$, $R^2$, $R^3$ and $R^4$ can have various permutations and combinations of meaning by combining the above sub-embodiments explicitly discussed for each substituent, as if each permutation and combination was fully set forth herein in the text. For example, Formula (I) should be understood as encompassing compounds where one or more of the following is met: (1) $R^1$ is selected from the group consisting of an alkyl group, a cycloalkyl group, an alkenyl group, and an alkynyl group; (2) $R^1$ is a hydrocarbyl group having from 2 to 20 carbon atoms, (3) $R^1$ is a hydrocarbyl group having 4 to 16 carbon atoms; (4) $R^1$ is a hydrocarbyl group having 8 to 12 carbon atoms; (5) $R^1$ is an alkyl group having from 2 to 20 carbon atoms; (6) $R^1$ is an alkyl group having 4 to 16 carbon atoms; (7) $R^1$ is an alkyl group having 8 to 12 carbon atoms; (8) $R^1$ is an alkyl group; (9) $R^2$ is selected from the group consisting of an alkyl group, a cycloalkyl group, an alkenyl group, an alkynyl group, and a phenyl group; (10) $R^2$ is selected from alkyl groups having 1 to 4 carbon atoms; (11) $R^2$ is methyl or ethyl; (12) $R^3$ is selected from the group consisting of hydrogen, an alkyl group, an alkenyl group, and an alkynyl group; (13) $R^3$ is hydrogen; (14) [insert other options for R3, from above]; (15) $R^4$ is selected from the group consisting of hydrogen, an alkyl group, an alkenyl group, and an alkynyl group; (16) $R^4$ is hydrogen; (17) [insert other options for R4, from above].

Non-limiting examples of compounds suitable for use as the imidazole-based SSA of Formula (I) include: 1-decyl-2-methylimidazole and 1-benzyl-2-methylimidazole.

As discussed above, the rubber compositions and processes include/make use of a conjugated diene polymer or copolymer component. (By stating that the rubber composition includes or the process makes use of a conjugated diene polymer or copolymer component, it should be understood that one or more than one (e.g., two, three, or more) conjugated diene polymers or copolymers may be utilized. In other words, the use of the phrase a conjugated diene polymer or copolymer component should not be understood to be limited to only one such polymer or copolymer.) In accordance with the embodiments disclosed herein, the conjugated diene polymer or copolymer component is present in the rubber composition at 100 phr of the rubber composition. In accordance with certain exemplary embodiments disclosed herein, the conjugated diene polymer or copolymer component includes at least one of a conjugated diene polymer or copolymer derived from, for example, the polymerization of one or more of the following conjugated diene monomer units: 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentanediene, 1,3-cyclohexadiene, 1,3-cycloheptadiene, 1,3-cyclooctadiene, and combinations thereof. In certain exemplary embodiments disclosed herein, suitable conjugated diene polymers and conjugated diene copolymers used in the rubber compositions disclosed herein can be derived from the polymerization of one or more of the conjugated diene monomers disclosed above and one or more vinyl aromatic hydrocarbon monomers. Examples of suitable vinyl aromatic hydrocarbon monomers for use in certain exemplary embodiments include, but are not limited to styrene, α-methylstyrene, p-methylstyrene, o-methylstyrene, p-butylstyrene, vinylnaphthalene, and combinations thereof.

Such conjugated diene polymer or copolymer derived from the aforementioned monomers and suitable for use in certain exemplary embodiments disclosed herein may be prepared and recovered according to various suitable polymerization methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Non-limiting examples of conjugated diene polymer or copolymers derived from the above-listed monomers and suitable for use in certain exemplary embodiments disclosed herein include polyisoprene, polybutadiene, butadiene-isoprene copolymer, butadiene-isoprene-styrene copolymer, isoprene-styrene copolymer, styrene-butadiene copolymer, butyl rubber, and halogenated butyl rubber.

In accordance with certain exemplary embodiments according to the first, second, and third embodiments disclosed herein, the conjugated diene polymer or copolymer component includes at least one of a polyisoprene, polybutadiene, butadiene-isoprene copolymer, butadiene-isoprene-styrene copolymer, isoprene-styrene copolymer, styrene-butadiene copolymer, natural rubber, butyl rubber, and halogenated butyl rubber. In accordance with certain exemplary embodiments according to the first, second, and third embodiments disclosed herein, the conjugated diene polymer or copolymer includes at least one of polyisoprene, polybutadiene, styrene-butadiene copolymer, and natural rubber.

In certain exemplary embodiments disclosed herein, the conjugated diene polymer or copolymer component includes at least one silica-reactive functionalized conjugated diene polymer or copolymer. In certain of these embodiments, the silica-reactive functionalized conjugated diene polymer or copolymer may form all, none, or part of the conjugated diene polymer or copolymer component. In other words, rubber compositions disclosed herein may comprise 0 to 100 phr, including 10 to 90 phr, 20 to 80 phr, and 30 to 70 phr of the silica-reactive functionalized conjugated diene polymer or copolymer. Thus, when the silica-reactive functionalized conjugated diene polymer or copolymer forms part of the conjugated diene polymer or copolymer component, an unmodified, i.e., non-functionalized, conjugated diene polymer or copolymer, according to those conjugated diene polymer or copolymer disclosed herein, is also present in this component.

In certain exemplary embodiments according to the first, second, and third embodiments disclosed herein, the conjugated diene polymer or copolymer is essentially free of a silica-reactive functionalized conjugated diene polymer or copolymer. In other words, the conjugated diene polymer or copolymer is essentially free of such functionalized polymer or copolymer. As used herein, the phrase essentially free of a silica-reactive functionalized conjugated diene polymer or copolymer should be understood as containing no more than 5 phr, preferably no more than 1 phr, even more preferable 0 phr. Examples of silica-reactive functional groups that are known to be utilized in functionalizing conjugated diene polymers and copolymers include nitrogen-containing functional groups, silicon-containing functional groups, oxygen or sulfur-containing functional groups, and metal-containing functional group. As used herein, the term functionalized polymer or copolymer should be understood to be contain as a part of the polymer structure a functional group at one or both terminus (e.g., from use of a functionalized initiator, a functionalized terminator, or both) or a functional group or a functional group in the main chain of the polymer. For example, a silica-reactive functionalized polymer or copolymer may have the functional group at one or both terminus, in the main chain thereof, or both.

Non-limiting examples of nitrogen-containing functional groups known to be utilized include, but are not limited to, any of a substituted or unsubstituted amino group, an amide residue, an isocyanate group, an imidazolyl group, an indolyl group, a nitrile group, a pyridyl group, and a ketimine group. The substituted or unsubstituted amino group includes a primary alkylamine, a secondary alkylamine or a cyclic amine, and an amino group derived from a substituted or unsubstituted imine.

Non-limiting examples of silicon-containing functional groups known to be utilized include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups also include those disclosed in U.S. Pat. No. 6,369,167, the entire disclosure of which is hereby incorporated by reference.

Non-limiting examples of oxygen or sulfur-containing functional groups known to be utilized for the silica-reactive functionalized conjugated diene polymer or copolymer include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. The alkoxy group may be an alcohol-derived alkoxy group derived from a benzophenone.

In certain exemplary embodiments according to the first, second, and third embodiments disclosed herein, the vulcanizable rubber compositions, the vulcanized rubber compositions, or both, contain a silica coupling agent. As used herein, the phrase silica coupling agent refers to a conventional type of silica coupling agent, such as those having a silane and a constituent component or moiety that can react with a polymer, particularly a vulcanizable polymer. The silica coupling agent acts as a connecting bridge between silica and the polymer. Suitable silica coupling agents include those containing groups such as mercapto, blocked mercapto, polysulfide, amino, vinyl, epoxy, and combinations thereof.

Examples of silica coupling agents for use in certain exemplary embodiments disclosed herein include, but are not limited to, alkyl alkoxysilanes (including bis(trialkoxysilylorgano polysulfides)), blocked mercaptosilanes, and mercaptosilanes. Alkyl alkoxysilanes have the general formula $R^6{}_p Si(OR^2)_{4-p}$ where each $R^2$ is independently a monovalent organic group, and p is an integer from 1 to 3, with the proviso that at least one $R^6$ is an alkyl group. Preferably p is 1. Generally, each $R^6$ independently comprises $C_1$ to $C_{20}$ aliphatic, $C_5$ to $C_{20}$ cycloaliphatic, or $C_6$ to $C_{20}$ aromatic; each $R^2$ independently comprises $C_1$ to $C_6$ aliphatic. In certain exemplary embodiments, each $R^6$ independently comprises $C_6$ to $C_{15}$ aliphatic and in additional embodiments each $R^6$ independently comprises $C_8$ to $C_{14}$ aliphatic. Mercaptosilanes have the general formula $HS—R^3—Si(R^4)(R^5)(R^5)$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercaptosilanes have the general formula $B—S—R^7—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^7$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes include octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of alkyl alkoxysilanes include hexyltriethoxysilane, heptyltriethoxysilane, octyltriethoxysilane, nonyltriethoxysilane, decyltriethoxysilane, dodecyltriethoxysilane, tetradecyltriethoxysilane, octadecyltriethoxy-silane, hexyltrimethoxysilane, heptyltrimethoxysilane, octyltrimethoxysilane, nonyltrimethoxysilane, decyltrimethoxysilane, dodecyltrimethoxysilane, tetradecyltri-methoxysilane, octadecyltrimethoxysilane, and mixtures thereof.

Non-limiting examples of bis(trialkoxysilylorgano)polysulfides herein include bis(trialkoxysilylorgano)disulfides and bis(trialkoxysilylorgano)tetrasulfides. Specific non-limiting examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silane coupling agents include bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercaptosilanes include, but are not limited to, those described in U.S. Pat. Nos. 6,127,468; 6,204,339; 6,528,673; 6,635,700; 6,649,684; 6,683,135; the disclosures of which are hereby incorporated by reference. Representative examples of the silanes include, but are not limited to, 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthio-phosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithio-phosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercaptosilanes can be used. A further example of a blocked mercaptosilane is NXT™ silane (3-octanoylthio-1-propyltriethoxysilane), commercially available from Momentive Performance Materials Inc. of Albany, N.Y.

In certain exemplary embodiments according to the first, second, and third embodiments disclosed herein, the vulcanizable and vulcanized rubber composition is essentially free of silica coupling agent. As used herein, the phrase essentially free of any silica coupling agent should be understood to mean no more than 0.001 phr, preferably no more than 0.0001 phr, even more preferably 0 phr and the phrase silica coupling agent should be understood to have the meaning described in the preceding paragraphs. Use of the imidazole-based silica shielding agents of Formula (I) in silica-containing rubber compositions has the benefit of decreasing the Mooney viscosity of the rubber composition (as measured prior to any vulcanization) even in the absence of use of a silica coupling agent, as has been typically required in prior art silica-containing rubber compositions. Therefore, use of the imidazole-based silica shielding agents of Formula (I) in silica-containing rubber compositions that are essentially free of any silica coupling agent provides the benefits of better dispersability of the silica filler without the previously experienced disadvantages that can be caused by the use of a silica coupling agent.

In certain exemplary embodiments according to the first, second, and third embodiments disclosed herein, the vulcanizable and vulcanized rubber composition is essentially free of silica coupling agent and essentially free of a silica-reactive functionalized conjugated diene polymer or copolymer.

As discussed above, the vulcanizable and vulcanized rubber compositions disclosed herein, and the process for preparing a vulcanized rubber composition utilize silica as a filler. Examples of suitable silicas for use as the silica filler include, but are not limited to, precipitated amorphous silicas, wet silicas (hydrated silicic acid), dry silicas such as fumed silica, calcium silicate, and the like. Other suitable fillers include aluminum silicate, magnesium silicate, and the like. The surface area, as measured by the BET method gives the best measure of the reinforcing character of different silica fillers. In certain exemplary embodiments, the surface area of the silica filler is about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8 (such pH as can be determined on a solution of silica according to ASTM D6379-11 Standard Test Method for Silica—pH value). In accordance with certain exemplary embodiments according to the first, second, and third embodiments disclosed herein, silica is present in/used in an amount of 5 to 150 phr of silica, including from 10 to 130 phr, and including from 40 to 80 phr of silica.

In certain exemplary embodiments according to the first, second, and third embodiments disclosed herein, carbon black is additionally utilized as a filler in the rubber composition. Examples of suitable types of carbon blacks for use in the rubber compositions and processes disclosed herein include, but are not limited to, furnace blacks, channel blacks, and lamp blacks. Such carbon blacks can include any of the commonly available, commercially-produced carbon blacks. Those carbon blacks having a surface area (EMSA) of at least 20 $m^2/g$ and, more preferably, at least 35 $m^2/g$ up to 200 $m^2/g$ or higher are preferred. Surface area values used in this disclosure are determined by ASTM D-1765 using the cetyltrimethyl-ammonium bromide (CTAB) technique. Specific non-limiting examples of suitable carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other examples of suitable carbon blacks include, but are not limited to, acetylene blacks. Furthermore, a mixture of two or more of the aforementioned carbon blacks can be used as the filler in certain exemplary embodiments of the rubber compositions disclosed herein. The grades of the carbon blacks suitable for use in certain exemplary embodiments of the rubber compositions disclosed herein are those characterized by ASTM D-1765, such as N-110, N-220, N-339, N-330, N-351, N-550, N-660, and N990 grades. The carbon blacks can be in a pelletized form or an unpelletized flocculent mass. For more uniform mixing, unpelletized carbon black is preferred. In accordance with certain exemplary embodiments, from 5 to 200 phr of carbon black, including from 40 to 100 phr, including from 40 to 80 phr, and including from 50 to 70 phr of carbon black is utilized.

As discussed above, the vulcanized rubber compositions according to the second embodiment and the processes for producing a vulcanized rubber composition according to the third embodiment, include a curative. As well, in certain exemplary embodiments according to the first embodiment, the rubber composition can include a curative. In certain exemplary embodiments according to the first, second, and third embodiments disclosed herein, the curative includes at least one of a vulcanizing agent; a vulcanizing accelerator; a vulcanizing activator (such as zinc oxide, stearic acid, and the like); a vulcanizing inhibitor, and an anti-scorching agent. Vulcanizing inhibitors and anti-scorching agents are known in the art and can be selected by one skilled in the art based on the vulcanizate properties desired. Unless otherwise indicated herein a "vulcanizing agent" refers to the compounds used alone, or as part of a system, to cure, i.e., crosslink, the rubber composition during vulcanization.

Examples of suitable types of vulcanizing agents for use in rubber compositions according to the first and second embodiments, and processes according to the third embodiment, include, but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to the first and second embodiments and processes according to the third embodiment include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

In certain exemplary embodiments disclosed herein, the rubber compositions (i.e., the vulcanizable rubber compositions according to the first embodiment, the vulcanized rubber compositions according to the second embodiment, and/or the vulcanized rubber compositions made according to the processes of the third embodiment) are employed in the manufacture of tires. These compositions can be processed into tire components according to ordinary tire manufacturing techniques including standard rubber shaping, molding, and curing techniques. Any of the various rubber tire components can be fabricated including, but not limited to, treads, sidewalls, belt skims, and carcass. Preferably, the rubber compositions containing imidazole-based silica shielding agents as disclosed herein are utilized in tire treads. Typically, vulcanization is effected by heating the vulcanizable composition in a mold; e.g., it may be heated to about 130° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference. In accordance with one or more embodiments of this disclosure, at least a portion of a tire is formed from the rubber compositions disclosed herein. Furthermore, in accordance with certain exemplary embodiments of this disclosure, a tire having at least a portion of a tread as the rubber compositions disclosed herein is produced using the rubber composition.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments.

Example 1

Compounding Evaluation of Rubber Formulations Containing an Imidazole-based Silica Shielding Agent Four silica-containing rubber compositions were prepared in a three stage mixing process (i.e., master-batch, remilling, and final batch) according to the formulations shown in Table 1. Samples 1 and 2 contained the imidazole-based silica shielding agent, one with silica coupling agent and one without. The imidazole-based silica shielding agent utilized was 1-decyl-2-methylimidazole (available from Sigma-Aldrich). Samples 3 and 4 did not contain any of the imidazole-based silica shielding agent, and one of these samples contained silica coupling agent and the other did not. The amounts of each ingredient used is reported as parts per hundred rubber (phr). The three-stage mixing process used for these formulations is outlined in Table 1A below. The compounding results of the formulations of Table 1 are shown in Table 2 below.

TABLE 1

Rubber Formulations

| Sample # | 1 | 2 | 3 | 4 |
|---|---|---|---|---|
| Master-Batch | | | | |
| SBR$^a$ | 100 | 100 | 100 | 100 |
| Silica$^b$ | 50 | 50 | 40 | 40 |
| Imidazole SSA | 3.45 | 3.45 | 0 | 0 |
| Silane coupling agent$^c$ | 4.4 | 0 | 4.4 | 0 |
| Antioxidant | 1 | 1 | 1 | 1 |

TABLE 1-continued

Rubber Formulations

| Sample # | 1 | 2 | 3 | 4 |
|---|---|---|---|---|
| Final Batch | | | | |
| ZnO | 2.5 | 2.5 | 2.5 | 2.5 |
| MBTS$^e$ | 2 | 2 | 2 | 2 |
| DPG$^f$ | 1.4 | 1.4 | 1.4 | 1.4 |
| TBBS$^g$ | 0.7 | 0.7 | 0.7 | 0.7 |
| Sulfur | 1.4 | 1.4 | 1.4 | 1.4 |

$^a$solution styrene-butadiene copolymer (non-functionalized)
$^b$Hi-Sil ™ 190 available from PPG Industries of Pittsburgh, Pennsylvania
$^c$Bis(triethoxysilylpropyl) disulfide
$^d$Santoflex anti-oxidant
$^e$2,2'-Dithiobis(benzothiazole).
$^f$Diphenyl guanidine.
$^g$(N-tert-butyl-2-benzothiazole-sulfenamide).

TABLE 1A

Three Stage Mixing Parameters

| Stage | Time | Condition |
|---|---|---|
| Master-Batch Stage (initial temp: 105° C., rotor 50 rpm started at __ seconds) | 0 seconds | Charge polymers |
| | 30 seconds | Charge filler (silica) and other master-batch ingredients |
| | 300 seconds | Drop based on time or max temperature of 160° C. |
| Remill Stage (initial temp: 105° C., rotor rpm at 50) | 0 seconds | Charge Master-Batch |
| | 120 seconds | Drop on mixing time or max temperature of 130° C. |
| Final Batch Stage (initial temp: 80° C., rotor rpm at 50) | 0 seconds | Charge Remill |
| | 0 seconds | Charge final batch ingredients |
| | 120 seconds | Drop on mixing time or max temperature of 110° C. |

TABLE 2

Compounding Results for the Formulations of Table 1

| Batch # | 1 | 2 | 3 | 4 |
|---|---|---|---|---|
| Amount of Imidazole-based SSA | 3.45 | 3.45 | 0 | 0 |
| Amount of silica coupling agent | 4.4 | 0 | 4.4 | 0 |
| ML$_{1+4}$ @ 130° C. (indexed) | 92.6 | 77.9 | 100 | 100 |
| ts5 (160° C.) in minutes (indexed) | 84.4 | 94.8 | 100 | 100 |
| ts90 (160° C.) in minutes (indexed) | 57.6 | 34.5 | 100 | 100 |
| G', SS @ 50° C., 10% strain, 15 Hz (indexed) | 89.3 | 57.0 | 100 | 100 |
| Δ G', SS @ 50° C., 10% strain, 0.03-15% (indexed) | 95.9 | 71.8 | 100 | 100 |
| tan δ, TS @ 60° C., 2% strain, 15 Hz (indexed) | 76.6 | 70.4 | 100 | 100 |
| 50% Modulus @ 23° C. (MPa) (indexed) | 98.3 | 77.5 | 100 | 100 |
| 200% Modulus @ 23° C. (MPa) (indexed) | 110 | 86.6 | 100 | 100 |
| Max. Stress @ 23° C. (MPa) (indexed) | 48.6 | 42.4 | 100 | 100 |
| Max. Strain @ 23° C. (%) (indexed) | 54.4 | 52.4 | 100 | 100 |
| 50% Modulus @ 100° C. (MPa) (indexed) | 104 | 92.5 | 100 | 100 |
| 200% Modulus @ 100° C. (MPa) (indexed) | — | 94.4 | 100 | 100 |
| Max. Stress @ 100° C. (MPa) (indexed) | 45.0 | 36.1 | 100 | 100 |
| Max. Strain @ 100° C. (%) (indexed) | 50.2 | 43.0 | 100 | 100 |

Selected properties for each of the rubber compositions discussed above were measured as follows.

Cure Time: The ts5 and ts90 values reported below are measurements of the time required to achieve 5% and 90% cure, respectively, at a temperature of 160° C. A Monsanto rheometer MDR 2000 from Alpha Technologies was utilized in performing the cure testing; the testing followed the guidance of, but was not restricted to ASTM D-2084.

Mooney Viscosity: The Mooney viscosities disclosed herein were determined at 130° C. using an Alpha Technologies Mooney viscometer with a large rotor, a one minute warm-up time, and a four minute running time. More specifically, the Mooney viscosity was measured by preheating a sample from each batch to 130° C. for one minute before the rotor starts. The Mooney viscosity was recorded for each sample as the torque at four minutes after the rotor started.

Viscoelastic Properties: Viscoelastic properties of cured rubber compounds were measured by two different methods. The first method is a temperature sweep test (designated TS) conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, is approximately 27 mm. The test was conducted using a frequency of 3.14 rad/sec. The temperature is started at −120° C. and increased to 100° C. The strain is 0.5% for the temperature range of −100° C. to −21° C., and 2% for the temperature range of −20° C. to 100° C. The second viscoelastic test was a strain sweep (designated SS) conducted with an Advanced Rheometric Expansion System (ARES) from TA Instruments. The test specimen had a cylindrical button geometry having a diameter of 9.27 mm and a 15.6 mm length. The test was conducted using a frequency of 3.14 rad/sec. The temperature was held constant at the desired temperature, i.e., 60° C. The strain was swept from 0.03% to 20%.

Tan δ was measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature, 60° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded.

Tensile Properties: Tensile mechanical properties were determined following the guidelines, but not restricted to, the standard procedure described in ASTM-D412, using micro dumbbell specimens with a dimension of 4 mm in width and 1.91 mm in thickness. A specific gauge length of 44 mm was used for the tensile test. Specimens were strained at a constant rate and the resulting force was recorded as a function of extension (strain). Force readings were expressed as engineering stresses by reference to the original cross-sectional area of the test piece. The specimens were tested at 23° C. The same tensile mechanical properties were also tested at 100° C. Maximum stress and maximum strain percentage were also measured at both temperatures.

As can be seen from the data presented in Table 2, above, compositions containing the imidazole-based SSA show a significant reduction in Mooney viscosity as compared to their respective control. (The control for Sample 1 is Sample 3 and the control for Sample 2 is Sample 4.) Index values shown in Table 1 represent: (the quotient of the measured value divided by its respective control) times 100. The reduction in Mooney viscosity that was achieved by use of the imidazole-based SSA in the rubber compositions lacking silica coupling agent is relatively more significant (77.9% of control) than the reduction in Mooney viscosity that was achieved by use of the imidazole-based SSA in the rubber compositions containing silica coupling agent (92.6% of control). A decrease in tan δ relative to that of the control (i.e., a decrease in the indexed tan δ relative to the control) shows less hysteresis loss as compared to the control. Generally, a decrease in hysteresis loss is desirable as it tends to translate to a decreased rolling resistance if the rubber composition were used in a tire tread. The compositions containing the imidazole-based SSA show a significant reduction in hysteresis (tan δ) as compared to their respective control. The reduction in hysteresis that was achieved by use of the imidazole-based SSA in the rubber compositions lacking silica coupling agent (76.6% of control) was only slightly less than the reduction achieved by use of the imidazole-based SSA in the rubber compositions containing silica coupling agent (70.4% of control). Certain of the tensile properties show a reduction in physical properties in compositions containing the imidazole-based SSA as compared to their respective control.

As used in the description herein and the appended claims, the singular forms "a," "an," and "the" are intended to include the plural forms as well, unless the context clearly indicates otherwise.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A vulcanizable rubber composition comprising a conjugated diene polymer or copolymer, silica, and from 0.5 to 20 phr of an imidazole represented by:

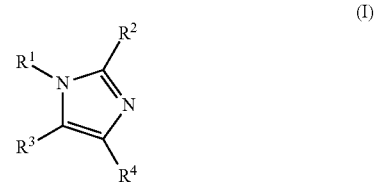

wherein:
$R^1$ is a hydrocarbyl group having from 2 to 20 carbon atoms,

R² is selected from the group consisting of a hydrocarbyl group having from 1 to 4 carbon atoms and a phenyl group, R³ is selected from the group consisting of hydrogen and a hydrocarbyl group having from 1 to 20 carbon atoms, and R⁴ is selected from the group consisting of hydrogen and a hydrocarbyl group having from 1 to 20 carbon atoms, and wherein the vulcanizable rubber composition contains 0 phr of silica coupling agent and 0 phr of silica-reactive functionalized conjugated diene polymer or copolymer.

2. The composition of claim 1, wherein

R¹ is selected from the group consisting of an alkyl group, a cycloalkyl group, an alkenyl group, and an alkynyl group;

R² is selected from the group consisting of an alkyl group, a cycloalkyl group, an alkenyl group, an alkynyl group, and a phenyl group;

R³ is selected from the group consisting of hydrogen, an alkyl group, an alkenyl group, and an alkynyl group; and R⁴ is selected from the group consisting of hydrogen, an alkyl group, an alkenyl group, and an alkynyl group.

3. The composition of claim 1, wherein R¹ is an alkyl group having from 4 to 16 carbon atoms.

4. The composition of claim 1, wherein R¹ is an alkyl group having from 8 to 12 carbon atoms.

5. The composition of claim 1, wherein R² is a methyl group, R³ is a hydrogen, and R⁴ is a hydrogen.

6. The composition of claim 1, wherein the composition comprises from 0.5 to 10 phr of the imidazole.

7. The composition of claim 1, wherein the composition comprises from 5 to 150 phr of silica.

8. The composition of claim 1, wherein the conjugated diene polymer or copolymer is selected from the group consisting of polyisoprene, polybutadiene, butadiene-isoprene copolymer, butadiene-isoprene-styrene copolymer, isoprene-styrene copolymer, styrene-butadiene copolymer, natural rubber, butyl rubber, halogenated butyl rubber, and combinations thereof.

9. The composition of claim 7, further comprising carbon black.

10. A vulcanized rubber composition comprising a mixture of the vulcanizable rubber composition of claim 9 and further comprising at least one curative, wherein the mixture has been vulcanized.

11. The composition of claim 10, wherein the at least one curative comprises at least one of: a vulcanizing agent, a vulcanizing accelerator, a vulcanizing activator, a vulcanizing inhibitor, and an anti-scorching agent.

12. A tire having a tread formed from the composition of claim 9.

13. A process for producing the vulcanized rubber composition of claim 1 comprising:

(a) mixing a master-batch comprising
(i) a conjugated diene polymer or copolymer,
(ii) silica, and
(iii) from 0.5 to 20 phr of an imidazole, wherein the imidazole is represented by:

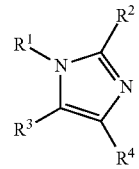

wherein:
R¹ is a hydrocarbyl group having from 2 to 20 carbon atoms,
R² is selected from the group consisting of a hydrocarbyl group having from 1 to 4 carbon atoms and a phenyl group,
R³ is selected from the group consisting of hydrogen and a hydrocarbyl group having from 1 to 20 carbon atoms,
R⁴ is selected from the group consisting of hydrogen and a hydrocarbyl group having from 1 to 20 carbon atoms;

(b) mixing a final batch comprising
(i) the master-batch, and
(ii) a curative; and (c) vulcanizing the final batch, thereby producing a vulcanized rubber composition, wherein the vulcanized rubber composition contains 0 phr of silica coupling agent and 0 phr of silica-reactive functionalized conjugated diene polymer or copolymer.

14. The process of claim 13, wherein R¹ is an alkyl group having from 4 to 16 carbon atoms.

15. The process of claim 13, wherein

R¹ is selected from the group consisting of an alkyl group, a cycloalkyl group, an alkenyl group, and an alkynyl group;

R² is selected from the group consisting of an alkyl group, a cycloalkyl group, an alkenyl group, an alkynyl group, and a phenyl group;

R³ is selected from the group consisting of hydrogen, an alkyl group, an alkenyl group, and an alkynyl group; and R⁴ is selected from the group consisting of hydrogen, an alkyl group, an alkenyl group, and an alkynyl group.

16. The process of claim 13, wherein

R¹ is an alkyl group having from 8 to 12 carbon atoms,
R² is a methyl group,
R³ is a hydrogen, and
R⁴ is a hydrogen.

17. The process of claim 13, wherein from 0.5 to 10 phr of the imidazole is used in the master-batch.

18. The process of claim 13, wherein from 5 to 150 phr of silica is used in the master-batch;

the conjugated diene polymer or copolymer is selected from the group consisting of polyisoprene, polybutadiene, butadiene-isoprene copolymer, butadiene-isoprene-styrene copolymer, isoprene-styrene copolymer, styrene-butadiene copolymer, natural rubber, butyl rubber, halogenated butyl rubber, and combinations thereof; and the curative is selected from the group consisting of a vulcanizing agent, a vulcanizing accelerator, a vulcanizing activator, a vulcanizing inhibitor, an anti-scorching agent, and combinations thereof.

19. The process of claim 13, further comprising remilling the master-batch prior to mixing the final batch.

20. A vulcanizable rubber composition comprising a conjugated diene polymer or copolymer, from 5 to 80 phr of silica, and from 0.5 to 10 phr of an imidazole represented by:

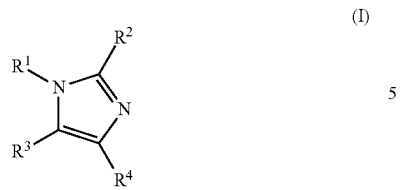

(I)

R$^1$ is selected from the group consisting of an alkyl group, a cycloalkyl group, an alkenyl group, and an alkynyl group;

R$^2$ is selected from the group consisting of an alkyl group, a cycloalkyl group, an alkenyl group, an alkynyl group, and a phenyl group;

R$^3$ is selected from the group consisting of hydrogen, an alkyl group, an alkenyl group, and an alkynyl group; and R$^4$ is selected from the group consisting of hydrogen, an alkyl group, an alkenyl group, and an alkynyl group, wherein the conjugated diene polymer or copolymer comprises at least one of polyisoprene, polybutadiene, butadiene-isoprene copolymer, butadiene-isoprene-styrene copolymer, isoprene-styrene copolymer, styrene-butadiene copolymer, natural rubber, butyl rubber, or halogenated butyl rubber, and wherein the vulcanizable rubber composition contains 0 phr of silica coupling agent and 0 phr of silica-reactive functionalized conjugated diene polymer or copolymer.

* * * * *